United States Patent
Sawada

(10) Patent No.: US 10,552,704 B2
(45) Date of Patent: Feb. 4, 2020

(54) IMAGE PROCESSING APPARATUS AND MEDIUM STORING PROGRAM EXECUTABLE BY IMAGE PROCESSING APPARATUS

(71) Applicant: BROTHER KOGYO KABUSHIKI KAISHA, Nagoya-shi, Aichi-ken (JP)

(72) Inventor: Kazuhide Sawada, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 427 days.

(21) Appl. No.: 15/441,513

(22) Filed: Feb. 24, 2017

(65) Prior Publication Data

US 2017/0249527 A1  Aug. 31, 2017

(30) Foreign Application Priority Data

Feb. 29, 2016  (JP) ................. 2016-037554

(51) Int. Cl.
*G06K 9/00* (2006.01)
*G06K 9/34* (2006.01)
(Continued)

(52) U.S. Cl.
CPC .......... *G06K 9/344* (2013.01); *G06K 9/4604* (2013.01); *G06K 9/4652* (2013.01); *G06K 9/52* (2013.01);
(Continued)

(58) Field of Classification Search
CPC .... G06K 9/344; G06K 9/4604; G06K 9/4652; G06K 9/52; G06T 3/40; H04N 1/393;
(Continued)

(56) References Cited

U.S. PATENT DOCUMENTS 5,359,673 A * 10/1994 de La Beaujardiere .....................
G06K 9/00442
382/229
5,491,439 A  2/1996 Kelkar et al.
(Continued)

FOREIGN PATENT DOCUMENTS

JP   H05-225378 A    9/1993
JP   2002-288589 A   10/2002
(Continued)

*Primary Examiner* — Sean T Motsinger
(74) *Attorney, Agent, or Firm* — Scully Scott Murphy and Presser

(57) ABSTRACT

An image processing apparatus includes a controller configured to execute: acquiring objective image data representing an objective image which includes a first character and a second character; analyzing first partial image data and specifying the first character in an image represented by the first partial image data; and generating processed image data representing a processed image which includes the first character and the second character by using the objective image data. The objective image data includes the first partial image data in a bitmap format which represents the image including the first character and second partial image data in a vector format which represents an image including the second character. The processed image data includes: first processed data representing an image including the first character; and second processed data representing an image including the second character.

12 Claims, 12 Drawing Sheets

(51) Int. Cl.
*G06K 9/46* (2006.01)
*G06K 9/52* (2006.01)
*G06T 3/40* (2006.01)
*H04N 1/393* (2006.01)
*H04N 1/409* (2006.01)

(52) U.S. Cl.
CPC .............. *G06T 3/40* (2013.01); *H04N 1/393* (2013.01); *H04N 1/4092* (2013.01); *G06K 2009/4666* (2013.01); *G06K 2209/01* (2013.01); *H04N 2201/0094* (2013.01)

(58) Field of Classification Search
CPC ... H04N 1/4092; H04N 1/6027; H04N 1/6072
See application file for complete search history.

(56) References Cited

U.S. PATENT DOCUMENTS

| | | | |
|---|---|---|---|
| 5,546,052 A | 8/1996 | Austin et al. | |
| 5,625,711 A * | 4/1997 | Nicholson | G06K 9/00442 382/190 |
| 5,729,637 A | 3/1998 | Nicholson et al. | |
| 6,256,114 B1 * | 7/2001 | Yoshikawa | H04N 1/00204 358/407 |
| 6,366,695 B1 * | 4/2002 | Nicholson | G06K 9/00442 382/173 |
| 7,164,493 B1 * | 1/2007 | Matsumoto | G06K 15/02 358/1.1 |
| 8,175,388 B1 * | 5/2012 | Fisher | G06K 9/3208 382/176 |
| 2002/0067859 A1 * | 6/2002 | Nicholson | G06K 9/00442 382/229 |
| 2003/0095286 A1 * | 5/2003 | Toda | G09G 5/393 358/1.16 |
| 2005/0180645 A1 * | 8/2005 | Hasegawa | G06K 9/00456 382/239 |
| 2008/0007785 A1 * | 1/2008 | Hashii | H04N 1/4072 358/3.01 |
| 2008/0050032 A1 | 2/2008 | Okuno et al. | |
| 2009/0274363 A1 * | 11/2009 | Dai | G06K 9/00456 382/164 |
| 2009/0316213 A1 * | 12/2009 | Cassidy | G06K 9/40 358/3.03 |
| 2010/0067793 A1 * | 3/2010 | Serrano | G06K 9/6297 382/179 |
| 2010/0171999 A1 * | 7/2010 | Namikata | G06K 9/00456 358/530 |
| 2010/0177965 A1 * | 7/2010 | Kanematsu | G06K 9/00979 382/182 |
| 2011/0019213 A1 * | 1/2011 | Safonov | G06K 15/128 358/1.9 |
| 2011/0235906 A1 | 9/2011 | Hashimoto | |
| 2012/0131520 A1 * | 5/2012 | Tang | G06F 3/04842 715/863 |
| 2013/0028520 A1 | 1/2013 | Kondo et al. | |
| 2016/0205282 A1 * | 7/2016 | Metcalfe | H04N 1/6027 358/448 |
| 2017/0249527 A1 * | 8/2017 | Sawada | G06K 9/344 |
| 2017/0344583 A1 * | 11/2017 | Nakatsuka | G06T 9/00 |

FOREIGN PATENT DOCUMENTS

| | | |
|---|---|---|
| JP | 2006-235733 A | 9/2006 |
| JP | 2007-042126 A | 2/2007 |
| JP | 2011-198291 A | 10/2011 |
| JP | 2013-030090 A | 2/2013 |

\* cited by examiner

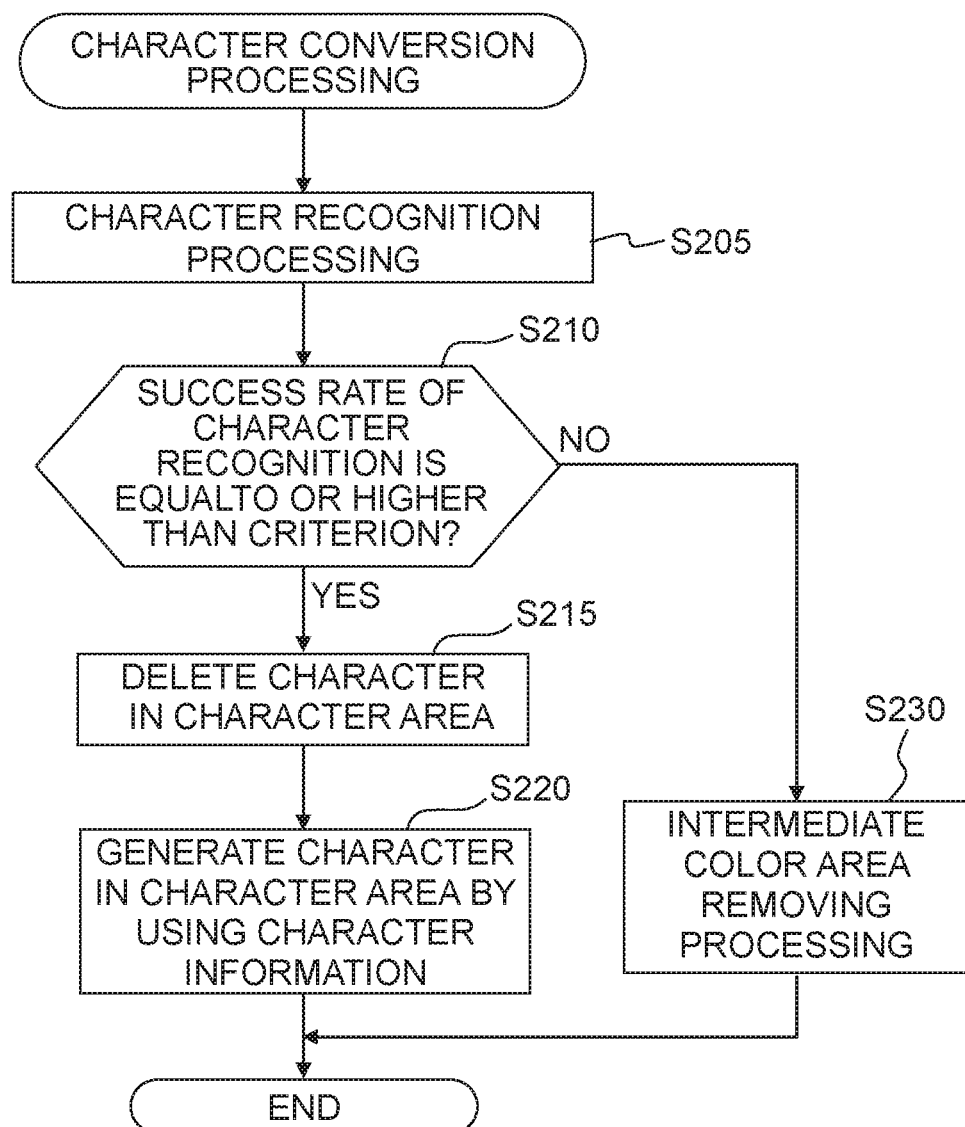

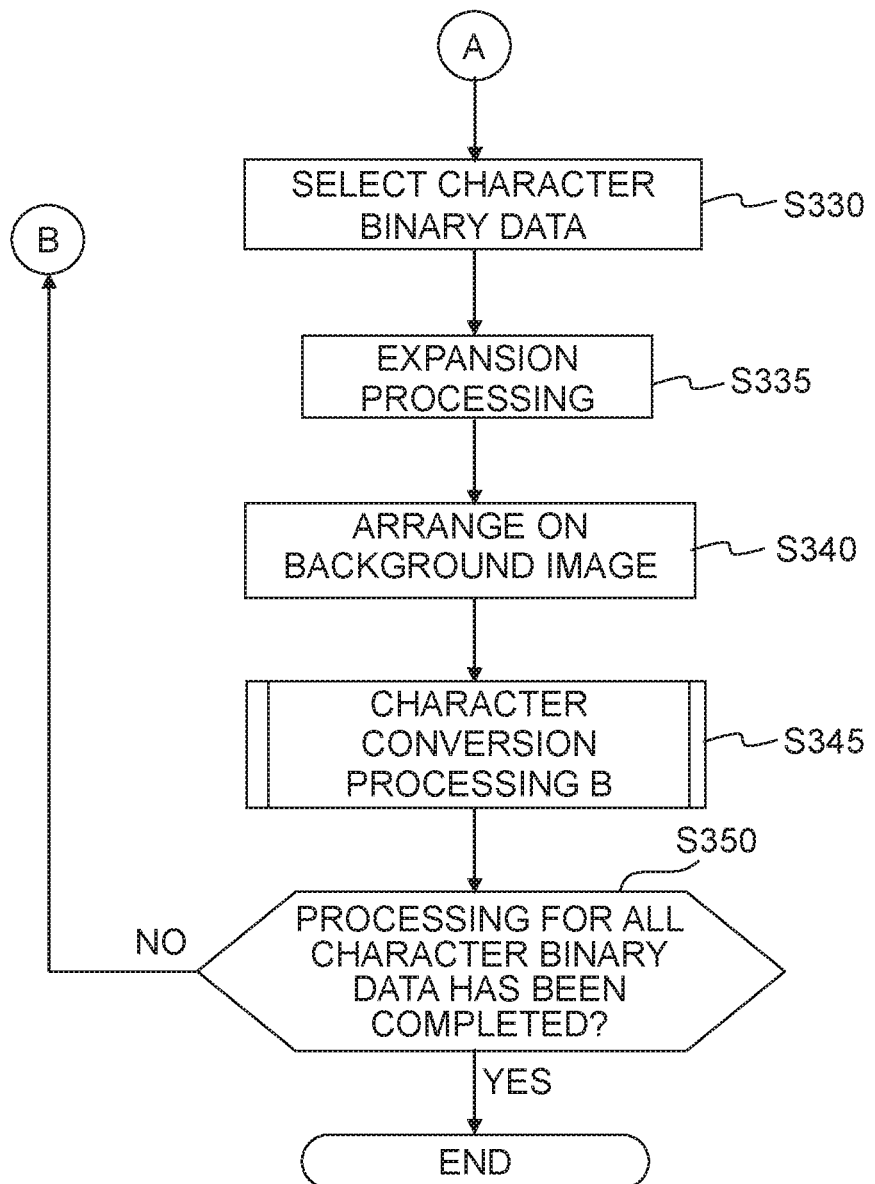

< BEFORE PROCESSING >

< AFTER PROCESSING >

IMAGE PROCESSING APPARATUS AND MEDIUM STORING PROGRAM EXECUTABLE BY IMAGE PROCESSING APPARATUS

CROSS REFERENCE TO RELATED APPLICATION

The present application claims priority from Japanese Patent Application No. 2016-037554 filed on Feb. 29, 2016, the disclosure of which is incorporated herein by reference in its entirety.

BACKGROUND

Field of the Invention

The present specification relates to image processing for an image that includes character areas represented by multiple kinds of data.

Description of the Related Art

Image data may include multiple kinds of data representing characters. For example, as a data structure representing an image, there is known a hybrid data structure including coded data representing a character and bitmap data representing a character.

SUMMARY

Regarding an image output by using such image data, in some cases, the appearance of an edge of a character represented by a single kind of data is different from the appearance of an edge of a character represented by any other kind of data. Allowing one image to include characters having mutually different appearances of edges may cause a user to feel a sense of incongruity in the image.

The present teaching is made to solve at least a part of the above programs. An object of the present teaching is to provide technology reducing incongruity caused in an image represented by image data that includes multiple kinds of data representing characters.

According to a first aspect of the present teaching, there is provided an image processing apparatus including a controller configured to execute: acquiring objective image data representing an objective image which includes a first character and a second character, the objective image data including first partial image data in a bitmap format which represents an image including the first character and second partial image data in a vector format which represents an image including the second character; analyzing the first partial image data; specifying the first character in the image represented by the first partial image data; and generating processed image data representing a processed image which includes the first character and the second character by using the objective image data, the processed image data including first processed data and second processed data, wherein the first processed data is acquired by executing first conversion processing on the first partial image data and represents an image including the first character having edge intensity which is higher than edge intensity of the first character in the image represented by the first partial image data, and wherein the second processed data represents an image including the second character having edge intensity which is not changed from edge intensity of the second character in the image represented by the second partial image data.

The edge intensity of the first character in the bitmap format is likely to be lower than the edge intensity of the second character in the vector format. In the above configuration, the processed image data includes: the first processed data which represents an image including the first character having the edge intensity which is higher than the edge intensity of the first character in the image represented by the first partial image data; and the second processed data which represents an image including the second character having the edge intensity which is not changed from the edge intensity of the second character in the image represented by the second partial image data. Thus, in the processed image, the edge intensity of the first character approximates the edge intensity of the second character, resulting in a reduced appearance difference between the first character and the second character. Accordingly, the processed image may have reduced incongruity.

According to a second aspect of the present teaching, there is provided an image processing apparatus including a controller configured to execute: acquiring objective image data representing an objective image which includes a first character and a second character, the objective image data including first partial image data in a bitmap format which represents an image including the first character and has a first gradation number and second partial image data in a bitmap format which represents an image including the second character and has a second gradation number smaller than the first gradation number; analyzing the first partial image data; specifying at least the first character in the image represented by the first partial image data; and generating processed image data representing a processed image which includes the first character and the second character by using the objective image data, the processed image data including: first processed data and second processed data, wherein the first processed data is acquired by executing first conversion processing on the first partial image data and represents an image including the first character having edge intensity which is higher than edge intensity of the first character in the image represented by the first partial image data, and wherein the second processed data represents an image including the second character having (A) edge intensity which is not changed from edge intensity of the second character in the image represented by the second partial image data or (B) edge intensity which is acquired by executing second conversion processing on the second partial image data and which is lower than the edge intensity of the second character in the image represented by the second partial image data.

The edge intensity of the first character represented by the first gradation number is likely to be lower than the edge intensity of the second character represented by the second gradation number. In the above configuration, the processed image data includes: the first processed data which represents an image including the first character having the edge intensity which is higher than the edge intensity of the first character in the image represented by the first partial image data; and the second processed data which represents an image including the second character having the edge intensity which is not more than the edge intensity of the second character in the image represented by the second partial image data. Thus, in the processed image, the edge intensity of the first character approximates the edge intensity of the second character, resulting in a reduced appearance difference between the first character and the second character. Accordingly, the processed image may have reduced incongruity.

Technology disclosed in the present specification may be achieved in various embodiments, for example, in embodiments including printing apparatuses, printing methods, display apparatuses, display methods, computer programs

BRIEF DESCRIPTION OF THE DRAWINGS

FIG. 5 is a flowchart of character conversion processing of the first embodiment.

FIGS. 8A and 8B are a flowchart of rasterize processing of the second embodiment.

DESCRIPTION OF THE EMBODIMENTS

[First Embodiment]<Structure of Image Processing Apparatus≥

Figure 1:
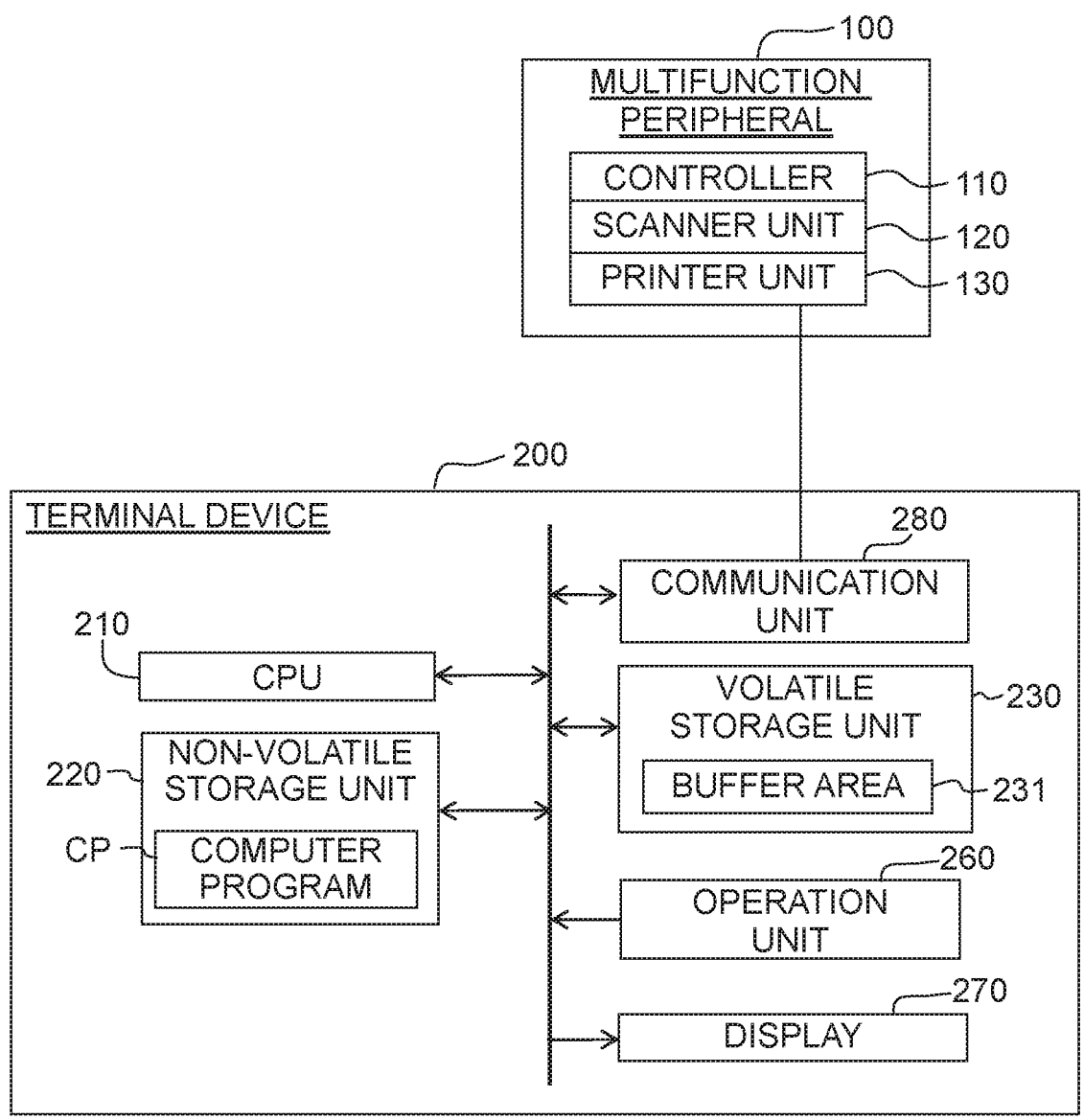
FIG. 1 is a block diagram depicting a configuration of a multifunction peripheral and a configuration of a calculator that is an image processing apparatus according to a first embodiment.

A structure of an image processing apparatus of a first embodiment will be described with reference to FIG. 1.

A calculator 200 that is the image processing apparatus of the first embodiment is, for example, a personal computer. The calculator 200 includes a CPU 210 that is a controller of the calculator 200, a non-volatile storage unit 220 such as a hard disk drive, a volatile storage unit 230 such as a RAM, an operation unit 260 such as a mouse and a keyboard, a display 270 such as a liquid crystal display, and a communication unit 280. The calculator 200 is communicably connected to an external apparatus, such as the multifunction peripheral 100, via the communication unit 280.

The volatile storage unit 230 provides a buffer area 231 that temporarily stores various kinds of intermediate data generated when the CPU 210 performs processing. The non-volatile storage unit 220 stores a computer program CP. In the first embodiment, the computer program CP is a printer driver program for controlling a printer unit 130 of the multifunction peripheral 100 as described later. The computer program CP may be downloaded from a server. Alternatively, the computer program CP may be stored, for example, in a DVD-ROM which is to be provided. The CPU 210 executes the computer program CP to perform print processing as described later.

The multifunction peripheral 100 includes a scanner unit 120, the printer unit 130, and a controller 110. The scanner unit 120 generates scan data by optically reading a document with an image sensor. The printer unit 130 prints an image on a printing medium, such as a paper sheet, by a predefined system (e.g., an ink-jet system or a laser system). The controller 110 includes a CPU and a memory controlling the scanner unit 120 and the printer unit 130.

<Print Processing>

Subsequently, print processing will be described with reference to FIG. 2. The print processing is started based on a start command by a user, for example, when a printer driver is being driven by executing the computer program CP in the calculator 200.

In a step S10, the CPU 210 acquires objective image data representing an objective image to be printed. The objective image data is, for example, a piece of image data that is selected based on user's designation from among multiple pieces of image data stored in the non-volatile storage unit 220.

Figure 3A:
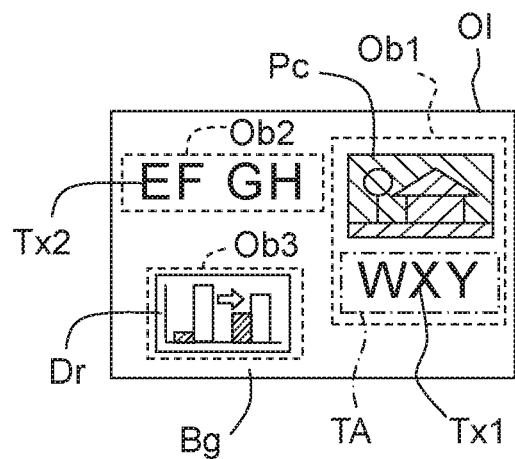
FIG. 3A depicts an exemplary objective image of the first embodiment and FIG. 3B depicts exemplary objective image data of the first embodiment.

An objective image OI of FIG. 3A includes three objects Ob1 to Ob3 and a background Bg. The first object Ob1 includes a picture Pc and a first character Tx1. The second object Ob2 includes a second character Tx2. The third object Ob3 includes a drawing Dr. The drawing Dr includes an illustration, a list or chart, a diagrammatic drawing, a pattern, and the like.

Objective image data ID is, for example, data describing an image according to page description language. The objective image data ID is, for example, an image file in Portable Document Format (PDF) or XML Paper Specification (XPS) format. Alternatively, the objective image data ID may be an image file that is created by an application program, such as a document preparation application, and is described in a format specific to the application program.

Figure 3B:
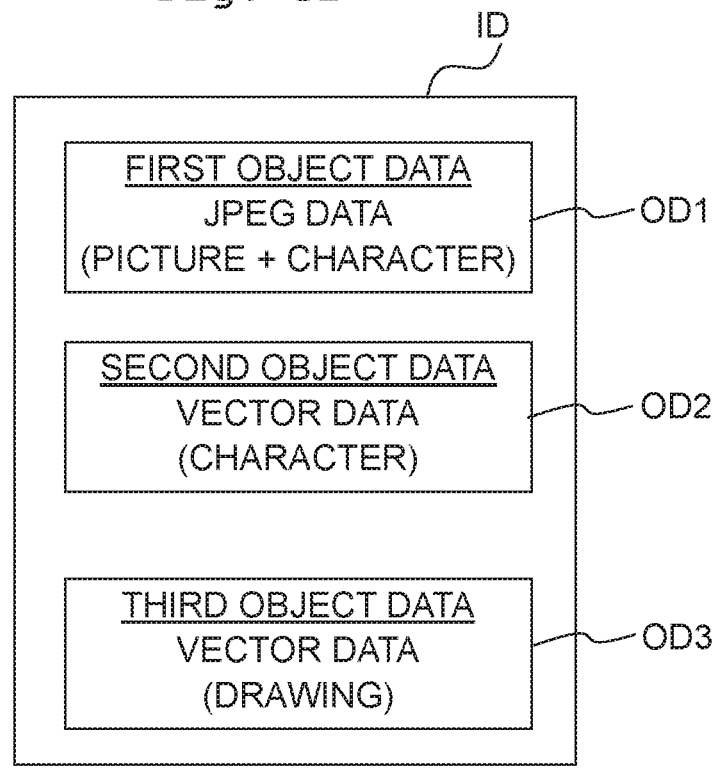

The objective image data ID may include multiple pieces of data in multiple kinds of data formats. For example, the objective image data ID of FIG. 3B includes first object data OD1 representing the first object Ob1, second object data OD2 representing the second object Ob2, and third object data OD3 representing the third object Ob3.

The first object data OD1 is bitmap data representing an image (i.e., the first object Ob1 of FIG. 3A) including the picture Pc and the first character Tx1. The first object data OD1 includes JPEG data representing the first object ob1 and coordinate information representing a position of the first object ob1 in the objective image OI. The JPEG data is acquired, for example, by performing Joint Photographic Experts Group (JPEG) compression of RGB image data representing the first object Ob1. The RGB image data is bitmap data formed by pixels, and colors for respective pixels are represented by RGB values. RGB values for each pixel have gradation values (hereinafter also referred to as component values) for three color components, red (R), green (G), and blue (B). In the first embodiment, respective component values have 256 gradations.

The second object data OD2 is vector data representing an image (i.e., the second object Ob2 of FIG. 3A) including the second character Tx2. The second object data OD2 includes, for example, a command describing the second character Tx2. This command includes, for example, a character code representing the second character Tx2, size information representing a size of the second character Tx2, font information representing a font of the second character Tx2, and coordinate information representing a position of the second character Tx2 in the objective image OI.

The third object data OD3 is vector data representing an image (i.e., the third object Ob3 of FIG. 3A) including the drawing Dr. The third object data OD3 includes a command describing the drawing Dr. This command includes diagrams and lines forming the drawing Dr, information defining colors of the diagrams and lines, and information defining positions of the diagrams and lines in the objective image OI.

In a step S20, the CPU 210 executes rasterize processing on the objective image data to generate processed image data of the objective image OI. The processed image data is bitmap data including pixels, in particular, RGB image data. Details of the rasterize processing will be described later.

In a step S30, the CPU 210 executes color conversion processing on the processed image data. This converts the RGB values of pixels of the processed image data into color values including component values that correspond to color materials for printing. In the first embodiment, the RGB values are converted into CMYK values including four component values of cyan (C), magenta (M), yellow (Y), and black (K).

In a step S40, the CPU 210 executes halftone processing on the processed image data that has been subjected to the color conversion processing to generate dot data representing dot formation states for respective pixels and respective color materials.

In a step S50, the CPU 210 generates printing job by using the dot data. For example, the CPU 210 executes processing for rearranging or sorting the dot data in an order to be used when printing is performed by the printer unit 130 and processing for adding a printer control code and a data identification code to the dot data. This generates a printing job that may be interpreted by the multifunction peripheral 100. In a step S60, the CPU 210 outputs the generated printing job to the multifunction peripheral 100. The printer unit 130 of the multifunction peripheral 100 prints an image based on the printing job output from the calculator 200.

<Rasterize Processing>

The rasterize processing in the step S20 of FIG. 2 will be described with reference to FIG. 4. In a step S100, the CPU 210 selects a piece of object data as a processing target from among the object data OD1 to OD3 included in the objective image data ID. In a step S105, the CPU 210 determines whether the object data as the processing target is vector data.

When the object data is vector data (S105: YES), the CPU 210 executes, in a step S110, expansion processing for expanding the object data on a canvas by interpreting a command included in the object data. The canvas is, for example, an RGB image having the same size as a processed image to be generated, in which values of all pixels have initial values. For example, when the object data is the second object data OD2 representing the second character Tx2 (second object Ob2), processed data generated by the expansion processing is RGB image data representing the second character Tx2. The image represented by the processed data, for example, the image including the second character Tx2, includes two kinds of pixels, that is, background pixels having a background color value that represents a background color and character pixels having a character color value that represents a character color. The image represented by the processed data includes no intermediate pixel having a gradation value between the background color value and the character color value. Thus, edge intensity of the second character Tx2 in that image is relatively high.

Here, the edge intensity is higher, as the gradient of change (change rate) in values ranging from the character color value to the background color value is higher at a boundary (edge) between the character pixel and the background pixel. Thus, the edge intensity is higher as a width of an intermediate color area including the intermediate pixel is smaller at the boundary between the character pixel and the background pixel. The edge intensity is higher as contrast between the character and the background is higher. The edge intensity may be calculated by adopting a known sobel filter.

When the object data as the processing target is the third object data OD3 representing the drawing Dr (third object Ob3), RGB image data representing the drawing Dr is generated as processed data.

When the object data as the processing target is not the vector data, that is, when the object data as the processing target is bitmap data (S105: NO), the CPU 210 executes, in a step S115, expansion processing for expanding the object data on a canvas. For example, when the object data is the first object data OD1 representing the first object Ob1 that includes the picture Pc and the first character Tx1 of FIG. 3A, JPEG data included in the first object data OD1 is expanded. This generates RGB image data representing the first object Ob1. When the object data as the processing target includes uncompressed RGB image data, the object data is arranged on the canvas as it is.

In the step S120, the CPU 210 executes processing for specifying a character area (hereinafter referred to as a character area specifying processing) on the RGB image data that has been generated in the step S115. The character area specifying processing specifies one or more character areas including a character(s) in the RGB image represented by the RGM image data. For example, the CPU 210 uses a known edge detection filter for scan data, extracts an edge in the RGB image, and specifies an area of which edge amount is higher than a criterion as an object area. The CPU 210 specifies, from among one or more specified object areas, an area having character characteristics, as the character area. The character characteristics include, for example, a smaller number of colors than a criterion and a smaller proportion of object pixels having a color different from the background color than a criterion. The character area specifying processing may be performed by various known methods, for example, those disclosed in Japanese Patent Application laid open No. 2013-030090, Japanese Patent Application laid open No. H5-225378, and Japanese Patent Application laid open No. 2002-288589.

For example, when the image represented by the RGB image data expanded in the step S115 is the first object Ob1 of FIG. 3A, a character area TA including the first character Tx1 in the first object Ob1 is specified. When the image represented by the RGB image data expanded in the step S115 includes no character, no character area is specified.

In a step S125, the CPU 210 determines whether the character area is specified by the character area specifying processing. When the character area has been specified (S125: YES), the CPU 210 executes, in a step S130, character conversion processing on the expanded RGB image data. Details of the character conversion processing will be described later. When the character area has not been specified (S125: NO), the CPU 210 skips the step S130. Accordingly, when the object data is the first object data OD1 representing the first object Ob1 that includes the first character Tx1, the character conversion processing is executed on the object data that has been expanded in the RGB image data.

In a step S140, the CPU 210 determines whether all the pieces of object data included in the objective image data ID have been processed. When unprocessed object data is present (S140: NO), the CPU 210 returns to the step S100 and selects the next object data. When all the pieces of object data have been processed (S140: YES), the CPU 210 ends the rasterize processing.

As with the objective image OI of FIG. 3A, the processed image represented by the processed image data after the rasterize processing includes the objects Ob1 to Ob3, that is, includes the first character Tx1, the second character Tx2, the picture Pc, and the drawing Dr. Due to the character conversion processing in the step S130, the edge intensity of the first character Tx1 in the processed image is higher than the edge intensity of the first character Tx1 in the objective image OI.

<Character Conversion Processing>

Subsequently, the character conversion processing in the step S130 of FIG. 4 will be described with reference to FIG. 5. In a step S205, the CPU 210 executes character recognition processing on an image in the character area (e.g., the character area TA of FIG. 3A) specified by the character area specifying processing.

The character recognition processing is processing for analyzing image data through the known Optical Character Reader (OCD) technology to generate character information representing a character in the image. The generated character information includes, for example, a character code that is identification information of the character in the image, position information representing a position of the character in the image, information representing a size of the character, information representing a font of the character, and information representing a color of the character.

In a step S210, the CPU 210 determines whether a success rate of character recognition is equal to or higher than a criterion based on the result of character recognition processing in the step S130. In the character recognition processing, when the character recognition for each character included in the character area is successful, information of each character is output. When the character recognition is unsuccessful, information indicating that the character recognition is unsuccessful is output. The CPU 210 calculates a proportion Tr of the number of characters for which the character recognition has been successfully performed with respect to the total number of characters included in the character area. The CPU determines whether the proportion Tr is equal to or higher than a predefined criterion (e.g., 80%).

When the success rate of the character recognition is equal to or higher than the criterion (S210: YES), the CPU 210 deletes the character in the character area in a step S215. In the example of FIG. 3A, the CPU 210 deletes the first character Tx1 in the character area TA temporarily. In particular, the CPU 210 specifies the background color value representing the background color of the character area and replaces all of the pixel values in the character area with the background color value. Those usable as the background color value include, for example, most frequent values (Rbg, Gbg, Bbg) of respective components of pixels in the character area.

In a step S220, the CPU 210 generates a character again in the character area by use of the generated character information. In particular, the CPU 210 arranges character pixels forming the character in the character area to form a character having the size, color, and font represented by the character information. In the example of FIG. 3A, the first character Tx1 is generated again in the character area TA.

For example, in the step S220, an image in the character area where the character has been generated again includes two kinds of pixels, for example, background pixels having a background color value and character pixels having a character color value. This image includes no intermediate pixel having a value representing a graduation between the background color value and the character color value. Meanwhile, the image in the character area TA before the character is deleted in the step S215 includes the character represented by JPEG data, and thus it also includes intermediate pixels in addition to the background pixels and character pixels. Therefore, the edge intensity of the character in the character area TA after being subjected to the processing S215 and S220 is higher than the edge intensity of the character in the character area TA before being subjected to the processing S215 and S220.

Figure 6A:
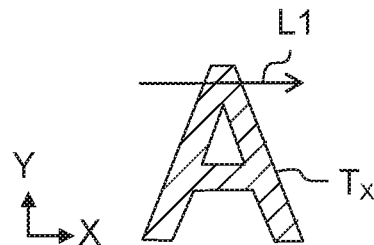
FIGS. 6A to 6D are illustrative views depicting processing for removing an intermediate color (neutral color) area.
Figure 6B:
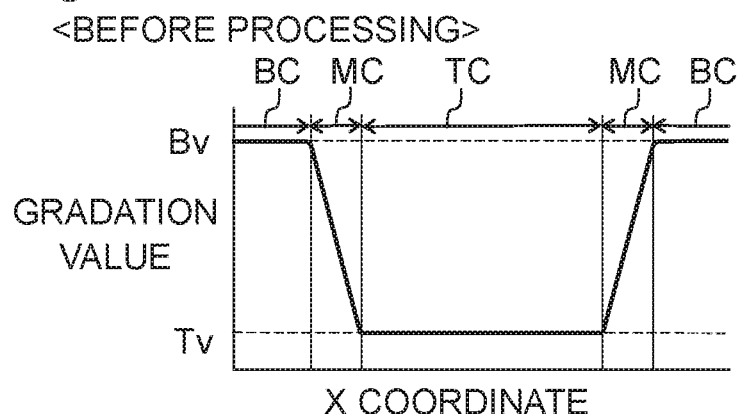

When the success rate of the character recognition is less than the criterion (S210: NO), the CPU 210 executes, in a step S230, processing for removing an intermediate color area. The processing for removing the intermediate color area will be described with reference to FIGS. 6A to 6C. FIG. 6A depicts the character Tx as an exemplary character in the character area. FIG. 6B is a graph indicating pixel values on a raster line L1 of FIG. 6A. The raster line L1 is a raster line that crosses the character Tx in a horizontal direction (an X direction of FIG. 6A). Although FIG. 6B depicts one component (e.g., R component), any other components may be depicted by graphs that are almost the same as FIG. 6B. The pixels on the raster line L1 include background pixels having a background color value By, character pixels having a character color value Tv, and intermediate pixels having a gradation value between the background color value By and the character color value Tv. FIG. 6B depicts a background color area BC formed by background pixels, a character color area TC formed by character pixels, and an intermediate color area MC formed by intermediate pixels. The intermediate color area MC is positioned between the background color area BC and the character color area TC.

Figure 6C:
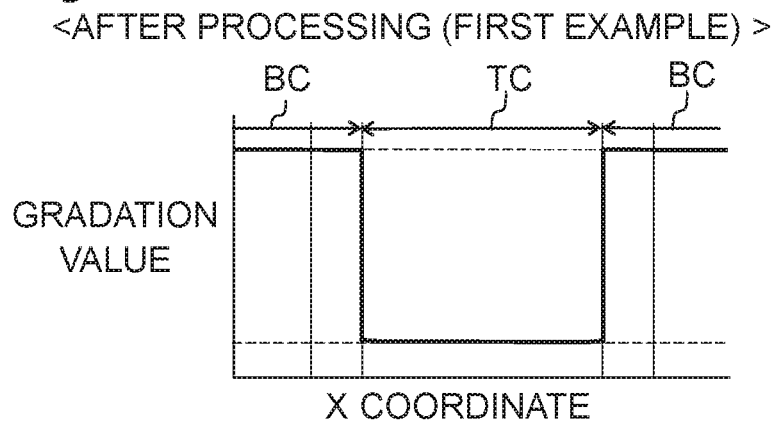

In the processing for removing the intermediate color area of the first embodiment, the CPU 210 removes intermediate pixels by replacing the respective intermediate pixels on all of the raster lines in the character area with background pixels. As a result, for example, as depicted in FIG. 6C, the intermediate color area MC is removed from the raster line L1 after processing. As depicted in FIG. 6C, removing the intermediate pixels makes a gradient changing from the background color value By to the character color value Tv greater in the vicinity of the edge between the character and the background, compared to a state before the processing for removing the intermediate color area. Thus, the edge intensity of the character in the character area after processing is higher than that before processing.

As understood from the above description, the edge intensity of the character in the character area after the character conversion processing is higher than the edge intensity of the character in the character area before the character conversion processing. Thus, it can be said that the character conversion processing is processing for converting the character in the image represented by the first object data OD1 into the character having edge intensity higher than that of the first object data OD1.

Figure 2:
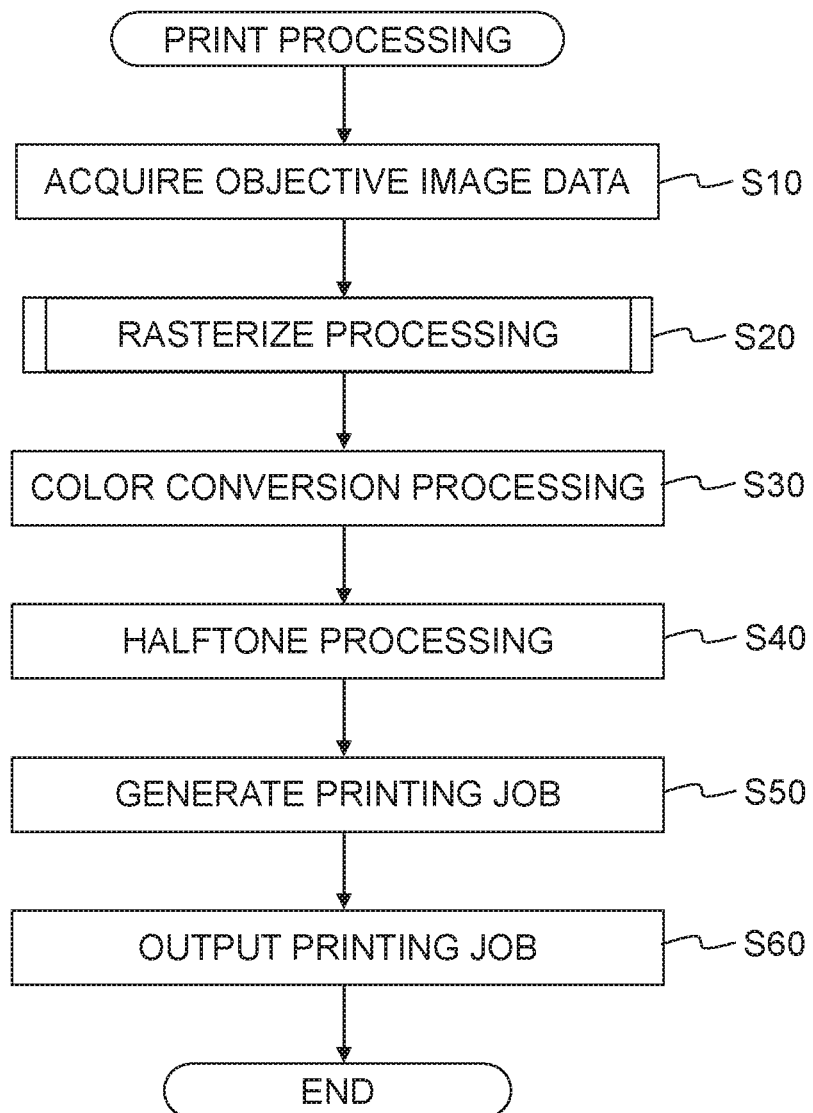
FIG. 2 is a flowchart of print processing.

According to the above-described first embodiment, the CPU 210 acquires the objective image data ID including the first object data OD1 representing the first character Tx1 in the bitmap format and the second object data OD2 representing the second character Tx2 in the vector format (S10 of FIG. 2). The CPU 210 generates, thorough the rasterize processing, the processed image data representing the processed image that includes the first character Tx1 and the second character Tx2 (S20 of FIG. 2). In the rasterize processing, the CPU 210 analyzes the first object data OD1 and specifies the first character Tx1 in the image (e.g., the first object Ob1) represented by the object data OD1 (S120 of FIG. 4). Then, the CPU 210 generates the processed image data including two kinds of processed data A1 and B1 described below.

Processed data A1: Processed data representing the first character Tx1 and having been subjected to the character conversion processing in the step S130 of FIG. 4.

Processed data B1: Processed data representing the second character Tx2 and not yet being subjected to the character conversion processing, namely, processed data of which edge intensity is not changed.

The edge intensity of the first character Tx1 in the bitmap format is likely to be lower than the edge intensity of the second character Tx2 in the vector format. This is because, as described above, the character image in the bitmap format may include intermediate pixels in addition to character pixels and the background pixels. Thus, if the objective image data ID is expanded simply in the RGB image data, the edge intensity of the first character Tx1 is lower than the edge intensity of the second character Tx2 in the image represented by the RGB image data. In such an image, for example, the first character Tx1 looks blurred compared to the second character Tx2, thus possibly causing the user to feel a sense of incongruity.

In the first embodiment, the processed image data generated by the rasterize processing includes the processed data A1 and the processed data B1. In this processed image, the edge intensity of the first character Tx1 approximates the edge intensity of the second character Tx2, thus reducing an appearance difference between the first character Tx1 and the second character Tx2. Accordingly, the processed image may have reduced incongruity, and consequently, an image to be printed by use of the processed image data may have reduced incongruity.

In the first embodiment, the character conversion processing of FIG. 5 includes the processing for generating character information that includes the character code of the first character Tx1 through execution of character recognition processing on the object image data OD1 (S205) and the processing for generating the processed data A1 by use of the character information (S220). It can be said that the character information is information that is substituted for the object data OD1 to represent the first character Tx1. This may increase the edge intensity of the first character Tx1 in the processed image as appropriate.

Further, the character conversion processing of FIG. 5 includes the processing (processing for removing the intermediate color area in the step S230) of reducing the number of intermediate pixels along the edge of the first character Tx1 in the bitmap image (RGB image) represented by the object data OD1. Reducing the number of intermediate pixels along the edge of the first character Tx1 may increase the edge intensity of the first character Tx1 in the processed image as appropriate.

In the character conversion processing of the first embodiment, when the success rate of character recognition is equal to or higher than the criterion (S210: YES) after the character recognition processing is performed on the object data OD1, the CPU 210 generates the processed data (S220) by use of the character information acquired through the character recognition processing (S205). When the success rate of character recognition is less than the criterion (S210: NO), the CPU 210 executes the processing for removing the intermediate color area (S230) without using character information. Namely, the character conversion processing using the character recognition processing and the character conversion processing without the character recognition processing may be selectively and appropriately used based on the success rate of character recognition. This may increase the edge intensity of the first character Tx1 in the processed image more appropriately.

In the first embodiment, the object data OD1 is exemplary first partial image data of the present teaching, and the second object data OD2 is exemplary second partial image data of the present teaching. The processed data A1 is exemplary first processed data of the present teaching, and the processed data B1 is exemplary second processed data of the present teaching.

[Second Embodiment]<Objective Image Data>

Figure 7A:
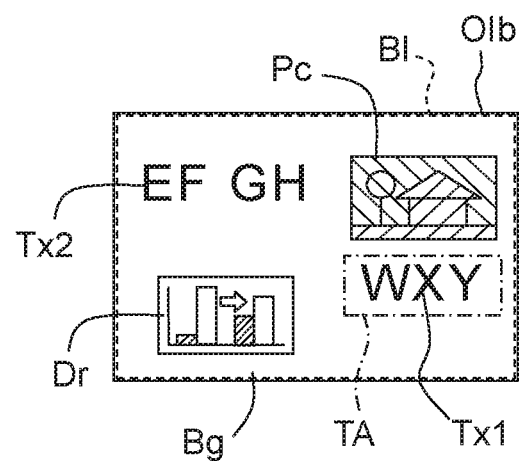
FIG. 7A depicts an exemplary objective image of a second embodiment and FIG. 7B depicts exemplary objective image data of the second embodiment.

Subsequently, a second embodiment will be described. As depicted in FIG. 7A, an objective image OIb of the second embodiment includes the characters Tx1, Tx2, the drawing Dr, the picture Pc, and the background Bg, as with the objective image OI of FIG. 3A.

Figure 7B:
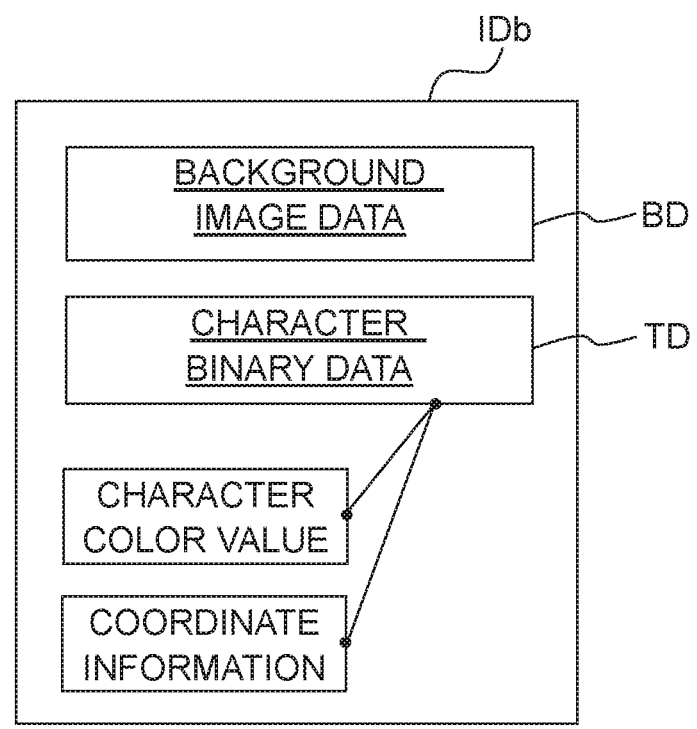

Objective image data IDb of FIG. 7B is so-called a high compression PDF file. The objective image data IDb of FIG. 7B includes compressed background image data BD representing a background image BI and compressed character binary data TD representing the second character Tx2. The objective image data IDb includes a character color value representing a color of the second character Tx2 and coordinate information representing a position of the second character Tx2 in the background image BI.

The objective image data IDb is generated with a prescribed calculator by use of, for example, original image data representing the objective image OIb, as follows. The original image data is, for example, RGB image data, such as scan data, which is generated by optically reading a document. A value of each pixel of the RGB image data has, for example, 256 gradations. The prescribed calculator is, for example, a CPU of a scanner generating scan data. The calculator analyzes the original image data, specifies a character area in the objective image OIb, and specifies character pixels forming a character in the character area. The calculator generates character binary data TD representing the character pixels. The calculator generates background image data BD representing the background image BI in which the character is eliminated from the objective image OIb, by replacing the value of the specified character pixels in the original image data with the background color value. The calculator compresses the character binary data TD by a FAXG3 system that is suitable for binary data compression, and compresses the background image data BD by a JPEG system that is suitable for multi-valued data compression. The calculator stores the compressed data TD and BD, the character color value, and the coordinate information in a PDF file to generate the objective image data IDb. Both of the background image data BD (RGB image data) and the character binary data TD are pieces of image data in the bitmap format. Note that, the value of each pixel of the background image data BD has, for example, 256 gradations, and the value of each pixel of the character binary data TD has, for example, 2 gradations smaller than those of the background image data BD.

Here, the background image BI represented by the background image data BD may include the background Bg, the picture Pc, the drawing Dr, and the first character Tx1, but it may not include the second character Tx2. Namely, although the first character Tx1 is a character, it may be included in the background image BI. This is because, for example, when a character area in the objective image OIb is specified in the process of generating the objective image data IDb, the character area including the first character Tx1 may be specified unsuccessfully.

In the second embodiment, the objective image data IDb generated beforehand is acquired in the step S10 of FIG. 2, as image data representing an image to be printed.

<Rasterize Processing>

The contents of rasterize processing in the second embodiment are different from those of the first embodiment. Other pieces of processing than the rasterize processing are the same as those in the first embodiment, and thus explanation therefor will be omitted.

The rasterize processing of the second embodiment will be described with reference to FIGS. 8A and 8B. In a step S300, the CPU 210 selects the background image data BD included in the objective image data IDb as a processing target. In a step S305, the CPU 210 expands compressed background image data BD to generate expanded background image data BD (RGB image data).

Figure 4:
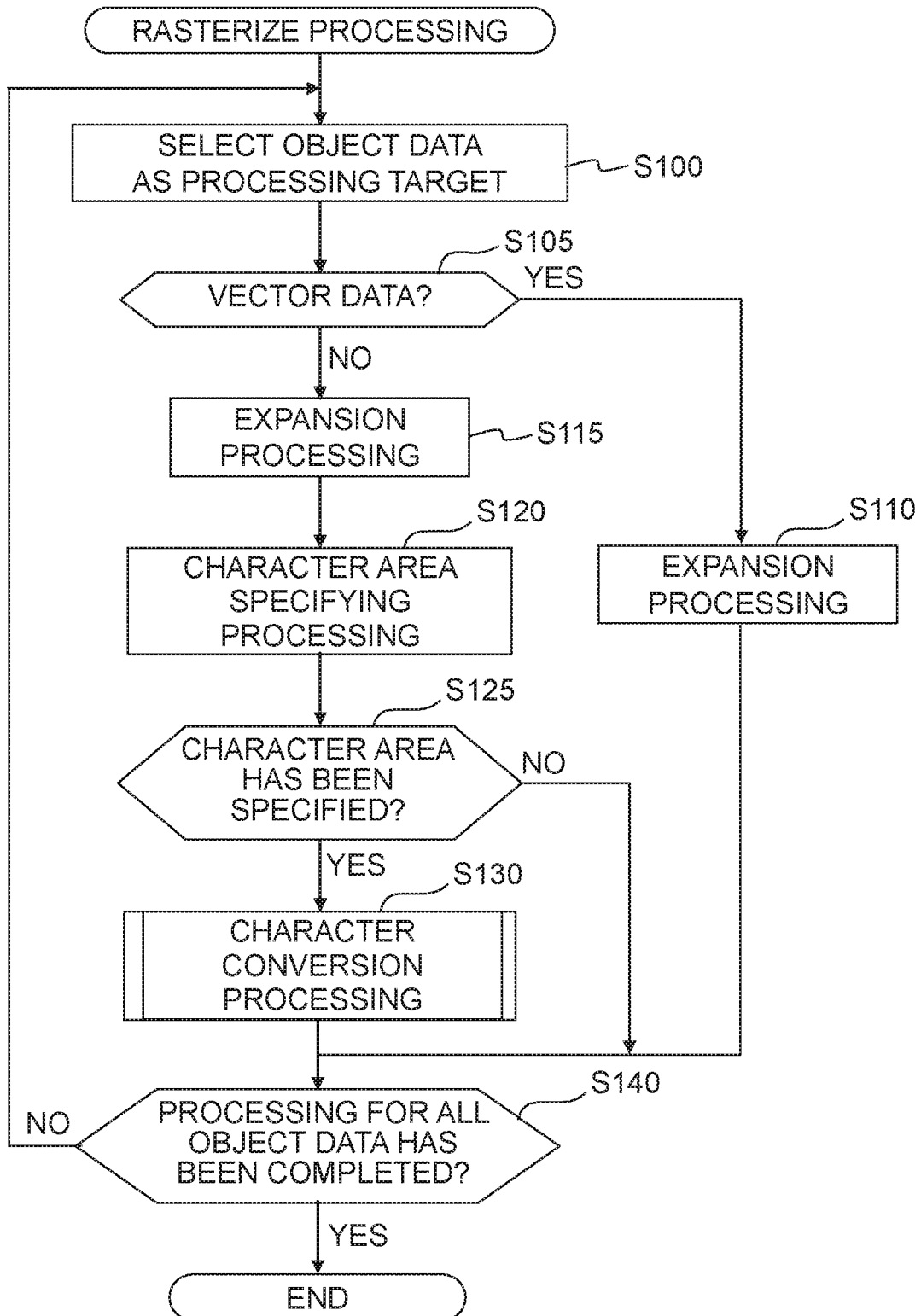
FIG. 4 is a flowchart of rasterize processing of the first embodiment.

In a step S310, the CPU 210 executes character area specifying processing that is the same as that performed in the step S120 of FIG. 4, on the expanded background image data BD. When the background image BI represented by the background image data BD includes, for example, the first character Tx1, like the example depicted in FIG. 7A, the CPU 210 specifies a character area TA including the character Tx1. When the background image BI includes no character, the CPU 210 specifies no character area.

In a step S315, the CPU 210 determines whether the character area is specified by the character area specifying processing. When the character area is not specified (S320: NO), the CPU 210 executes magnification processing in a step S325. The magnification processing magnifies the background image BI represented by the background image data BD depending on a size of a processed image to be generated. The size of the processed image to be generated is a size of an image to be printed, and it is determined based on print resolution. A magnification factor ER of the magnification processing is an increase rate of the number of pixels in vertical and horizontal directions. In the second embodiment, the magnification factor ER of the magnification processing is, for example, double (200%, ER=2). In that case, the CPU 310 executes the magnification processing to make the number of pixels in the horizontal direction double and make the number of pixels in the vertical direction double.

When the character area is specified (S315: YES), the CPU 210 executes, in the step S320, character conversion processing A on the expanded background image data BD. Details of the character conversion processing A will be described later. The character conversion processing A includes the magnification processing.

In the above-described steps S300 to S325, the CPU 210 generates processed data representing the background image BI.

In a step S330, the CPU 210 selects, as a processing target, a piece of character binary data TD included in the objective image data IDb. In a step S335, the CPU 210 expands compressed character binary data TD and generates expanded character binary data TD.

In a step S340, the CPU 210 arranges a character represented by the expanded character binary data TD, for example, the second character Tx2 of FIG. 7A, on the background image BI represented by the processed data generated in the steps S300 to S325. The CPU 210 magnifies the second character Tx2 depending on the size of the background image BI, for example. The CPU 210 arranges the magnified second character Tx2 at a position, of the background image BI, represented by the coordinate information with a color represented by the character color value. Since the background image BI is represented by the RGB image data, the second character Tx2 is arranged on the background image BI after being converted from the character binary data to the RGB image data.

In a step S345, the CPU 210 executes character conversion processing B on the second character Tx2 arranged on the background image BI. Details of the character conversion processing B will be described later.

In a step S350, the CPU 210 determines whether all the pieces of character binary data included in the objective image data IDb have been processed. Although a piece of character binary data is included in the objective image data IDb in the example of FIG. 7B, multiple pieces of character binary data may be included in the objective image data that is a high compression PDF file.

When unprocessed character binary data is present (S350: NO), the CPU 210 returns to the step S330 to select the unprocessed character binary data. When all the pieces of character binary data have been processed (S350: YES), the CPU 210 ends the rasterize processing. The rasterize processing described above generates the processed image data representing the processed image that includes the first character Tx1 and the second character Tx2, by use of the objective image data IDb.

<Character Conversion Processing A>

The character conversion processing A of the step S320 of FIG. 8A will be described with reference to FIG. 9.

Figure 8A:
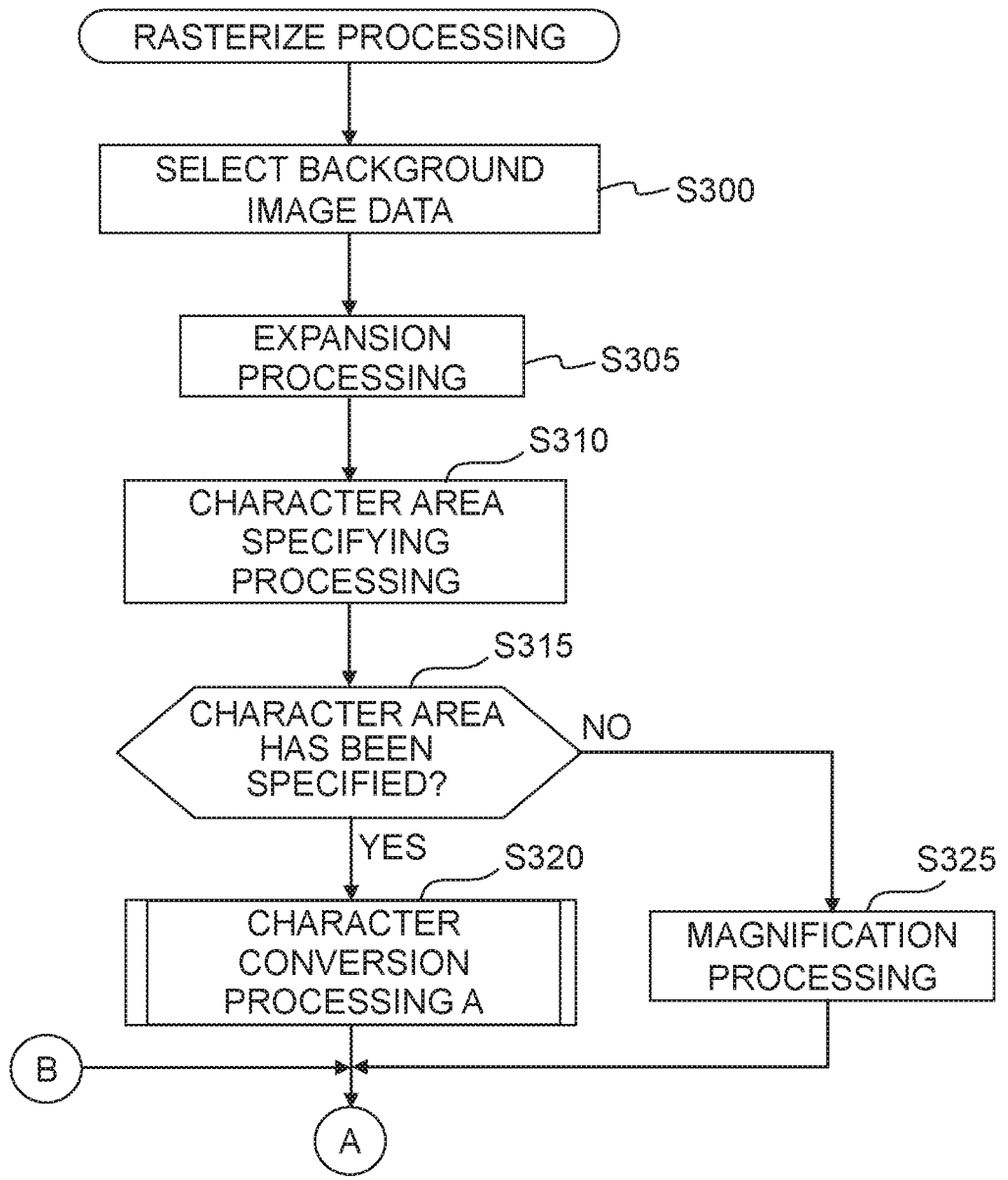
Figure 9:
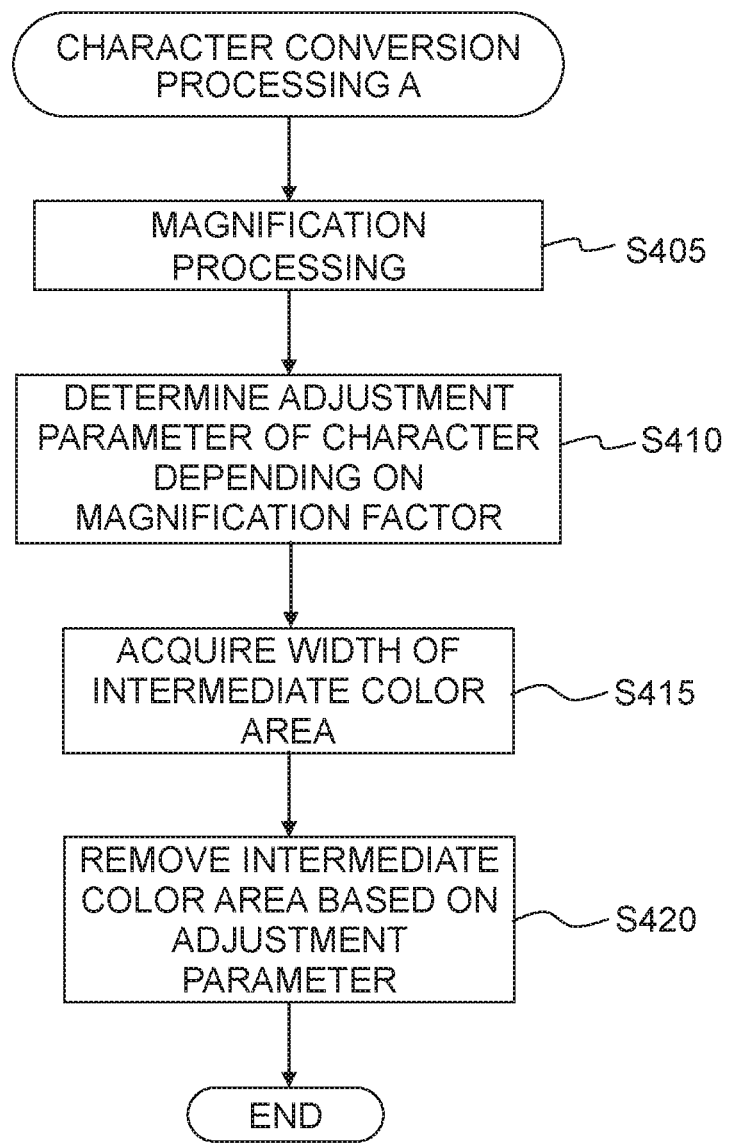
FIG. 9 is a flowchart of character conversion processing A of the second embodiment.

In a step S405, the CPU 210 executes magnification processing for magnifying the expanded background image data BD at the magnification factor ER, as with the step S325 of FIG. 8A.

In a step S410, the CPU 210 determines an adjustment parameter AP depending on the magnification factor ER of the magnification processing. The adjustment parameter AP is, for example, determined to a reciprocal of the magnification factor ER (AP=1/ER). The magnification factor ER is double in the second embodiment, and thus the adjustment parameter AP is determined to ½.

In a step S415, the CPU 210 analyzes an image of a character area (e.g., the character area TA of FIG. 7A) of the magnified background image BI to specify a width Wmc of the intermediate color area MC. For example, the CPU 210 analyzes pixels on the raster line L1 that crosses the character Tx in the character area TA depicted in FIG. 6A to specify the width Wmc of the intermediate color area MC depicted in FIG. 6B.

Figure 6D:
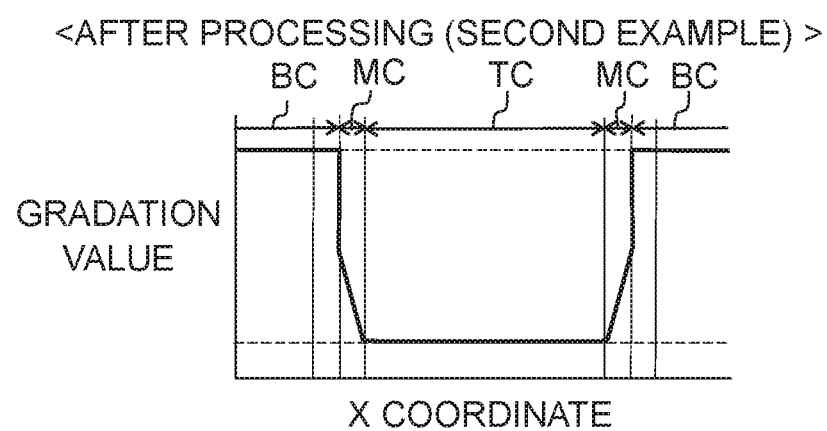

In a step S420, the CPU 210 removes a part of the intermediate color area MC based on the adjustment parameter AP. In particular, the CPU 210 remains only a part, of the intermediate color area MC, corresponding to the adjustment parameter AP on a side of the character color area TC, and removes a remaining part of the intermediate color area MC on a side of the background color area BC. The removal of the intermediate color area MC is performed by replacing each of the intermediate pixels forming the part to be removed with the background pixel, as with the process for removing the intermediate color area in S230 of FIG. 5. When the value of the adjustment parameter AP is ½, as depicted in FIG. 6D, a half of the intermediate color area MC of FIG. 6B on the side of the background color area BC is removed while a half of the intermediate color area MC of FIG. 6B on the side of the character color area TC is remained. When the magnification factor ER is triple, the value of the adjustment parameter AP is ⅓. Thus, in that case, two-thirds of the intermediate color area MC of FIG. 6B on the side of the background color area BC are removed while one-third of the intermediate color area MC of FIG. 6B on the side of the character color area TC is remained (not depicted).

As understood from the above explanation, in the character conversion processing A, the CPU 210 reduces the number of intermediate pixels depending on a first width (e.g., a width of ½) when the magnification factor ER of the magnification processing is a first magnification factor (e.g., double). The CPU 210 reduces the number of intermediate pixels depending on a second width (e.g., a width of ⅔) greater than the first width, when the magnification factor ER of the magnification processing is a second magnification factor (e.g., triple) greater than the first magnification factor.

In particular, in the character conversion processing A, the CPU 210 reduces the number of intermediate pixels depending on a width of $\{1-(1/M)\}$ of the intermediate color area MC, when the magnification factor ER of the magnification processing is M-times (M>1).

As a result, each pixel value appropriately changes depending on the magnification factor ER. This appropriately increases, for example, the edge intensity of the first character Tx1 (FIG. 7A) in the character area TA of the processed image. In particular, the magnification processing also magnifies a blurred part of the edge of the character, that is, the intermediate color area MC. This may cause the blurred character to be conspicuous in the magnified image. In the character conversion processing A, the number of intermediate pixels is reduced depending on the magnification factor ER of the magnification processing, and thus the edge intensity of the character in the magnified image may be increased so that blurring of the character in the magnified image has the same degree as that of the image before magnification.

Thus, it can be said that the character conversion processing A is processing for making the edge intensity of the character in the background image BI higher than the edge intensity of the character of the background image data BD.

<Character Conversion Processing B>

Subsequently, the character conversion processing B in the step S345 of FIG. 8B will be described with reference to FIG. 10.

In a step S505, the CPU 210 determines a smoothing parameter SP used in smoothing processing in a step S510. As the smoothing parameter SP, for example, a size P (P is an odd number not less than 3) of a smoothing filter is used. The smoothing filter has, for example, a pixel size of longitudinal P pieces by transverse P pieces around a target pixel, and an average value of pixels in a range of the filter is defined as a value of the target value. In the second embodiment, the smoothing parameter SP is determined as a predefined value.

In a step S510, the CPU 210 performs the smoothing processing on a character that is arranged on the background image BI and is based on the character binary data, for example, the second character Tx2 of FIG. 7A. The smoothing processing is executed by applying the smoothing filter to pixels in an area including the character to be processed. The size of the smoothing filter is determined based on the smoothing parameter SP.

Figure 11A:
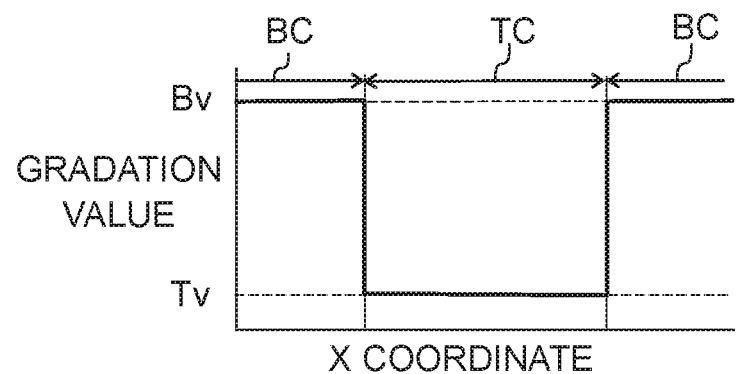
FIGS. 11A and 11B are illustrative views of the character conversion processing B.

In the smoothing processing, the intermediate color area MC formed by intermediate pixels is added along an edge of the character to be processed. As with the graph of FIG. 6B, FIG. 11A is a graph indicating pixel values, of the character that is subjected to the smoothing processing, on a rasterize line crossing the character. The character that is subjected to the character conversion processing B is a character based on character binary data. Thus, as depicted in FIG. 11A, the character before processing includes the character color area TC formed by character pixels and the background color area BC formed by background pixels, but it does not include the intermediate color area MC formed by intermediate pixels.

Figure 11B:
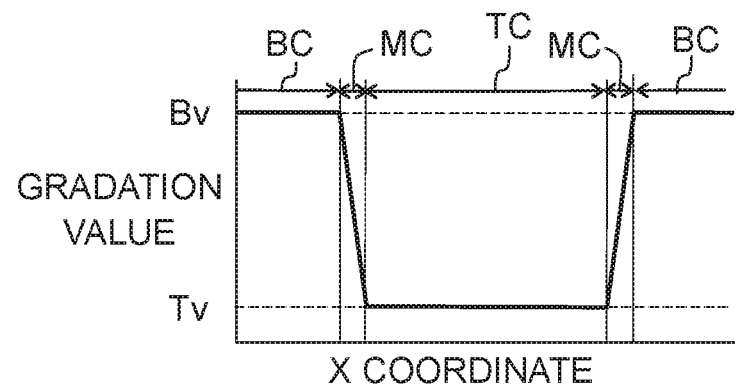

FIG. 11B is a graph indicating pixel values, of the character that has been subjected to the smoothing processing, on the same rasterize line as FIG. 11A. As depicted in FIG. 11B, in the smoothing processing, the intermediate color area MC formed by intermediate pixels is added to the edge between the character color area TC and the background color area BC. It can be said that the character conversion processing B is processing for increasing the number of intermediate pixels along the character to be processed.

Thus, according to the character conversion processing B, the edge intensity of the character in the processed image may be reduced as appropriate by increasing the number of intermediate pixels along the edge of the character to be processed, for example, the edge of the second character Tx2 of FIG. 7A.

The character binary data TD of the second embodiment is data acquired by binarizing scan data. An edge of a character in an image represented by the scan data typically includes a blurred area, namely, an area formed by intermediate pixels. Thus, the edge of the second character Tx2 represented by the character binary data TD is not smooth and it includes jaggies. Reducing the edge intensity by adding the intermediate color area MC to the second character Tx2 represented by the character binary data TD makes the jaggies of the edge of the character inconspicuous, which makes the character look like the character in the original image and thus improves the appearance of the character.

As understood from the above description, it can be said that the character conversion processing B is processing for converting the character represented by the character binary data TD into the character of which edge intensity is lower than that of the character binary data TD.

In the second embodiment, the CPU 210 acquires the objective image data IDb including the background image data BD and the character binary data TD. The background image data BD represents the background image BI including the first character Tx1 in the bitmap format of 256 gradations, and the character binary data TD represents the image including the second character Tx2 in the bitmap format of 2 gradations. The CPU 210 generates the processed image data representing the processed image that includes the first character Tx1 and the second character Tx2 by the rasterize processing of FIGS. 8A and 8B. In the rasterize processing, the CPU 210 analyzes the background image data BD to specify the first character Tx1 in the background image BI represented by the background image data BD (S310 of FIG. 8A). Then, the CPU 210 generates the processed image data including the following two kinds of processed data A2 and B2.

Processed data A2: Processed data representing the first character Tx1 and having been subjected to the character conversion processing A in the step S320 of FIG. 8A.

Processed data B2: Processed data representing the second character Tx2 and having been subjected to the character conversion processing B in the step S345 of FIG. 8B.

The edge intensity of the first character Tx1 represented in 256 gradations is likely to be lower than the edge intensity of the second character Tx2 represented in 2 gradations. This is because, the character image represented in 256 gradations may include intermediate pixels besides character pixels and background pixels. Thus, if the objective image data IDb is simply expanded in the RGB image data, as with the first embodiment, the edge intensity of the first character Tx1 is lower than the edge intensity of the second character Tx2 in the image represented by the RGB image data. In such an image, for example, the first character Tx1 looks blurred compared to the second character Tx2, thus possibly causing the user to feel a sense of incongruity.

In the second embodiment, the proceed image data generated by the rasterize processing includes the processed data A2 and the processed data B2. Thus. in the processed image, the edge intensity of the first character Tx1 approximates the edge intensity of the second character Tx2, thus reducing an appearance difference between the first character Tx1 and the second character Tx2. Accordingly, the processed image may have reduced incongruity, and consequently, an image to be printed by using the processed image data may have reduced incongruity.

In the second embodiment, the background image data BD is exemplary first partial image data of the present teaching, the character binary data TD is exemplary second partial image data of the present teaching, the processed data A2 is exemplary first processed data of the present teaching, and the processed data B2 is exemplary second processed data of the present teaching.

Modified Examples

The number of gradations of the object data OD1 of the first embodiment and the number of gradations of the background image data BD of the second embodiment are not limited to 256 gradations, and they may be, for example, 64 gradations or 128 gradations. In general, it is only required that the number of gradations of the object data OD1 of the first embodiment and the number of gradations of the background image data BD of the second embodiment be the number of gradations of 3 gradations or more.

Instead of the character conversion processing of the first embodiment and the character conversion processing A of the second embodiment, another processing for increasing the edge intensity of a character in an image to be processed may be performed. Instead of the character conversion processing B of the second embodiment, another processing for reducing the edge intensity of a character in an image to be processed may be performed. The another processing for increasing the edge intensity may be known contrast adjustment processing for increasing contrast in an image or known noise removal processing for removing noise in an image. The another processing for reducing the edge intensity may be known contrast adjustment processing for reducing contrast in an image or noise addition processing for adding noise to an image.

In the second embodiment, both of the character conversion processing A and the character conversion processing B are performed so that the edge intensity of the first character Tx1 approximates the edge intensity of the second character Tx2 in the processed image. Instead of this, only the character conversion processing A may be performed by omitting the character conversion processing B to reduce the difference in edge intensity between the first character Tx1 and the second character Tx2. In other words, the processed data B2 may be processed data representing the second character Tx2 in which the edge intensity of the character binary data TD is not changed. In that case, for example, the character conversion processing of the first embodiment may be performed instead of the character conversion processing A.

In the character conversion processing (FIG. 5) of the first embodiment, the character conversion processing (S215, S220) using the character recognition processing and the character conversion processing (S230) without the character recognition processing are selectively used based on the success rate of character recognition processing. Instead of this, for example, the two kinds of character conversion processing may be selectively used based on a user's command. In that case, for example, the CPU 210 displays a UI screen on the display 270 after the step S205 of FIG. 5 to show the user the result of character recognition processing. The CPU 210 acquires a user's command whether any of the two kinds of character conversion processing is to be used, via the UC screen. After that, the CPU 210 executes the character conversion processing based on the user's command.

In each of the embodiments, the processed image data generated in the step S20 of FIG. 2 is used to generate and output a printing job (S50, S60), and then printing of the processed image is performed. Instead of this, the processed image data generated in the step S20 may be used to display the processed image on the display 270. Or, the processed image data may be, for example, stored in a PDF file and saved in the non-volatile storage unit 220.

In the character conversion processing of FIG. 5, the character information of the first character Tx1 is acquired by performing the character recognition processing in the step S205. For example, when the objective image data ID is a PDF file, the character information of the first character Tx1 may be previously added to the objective image data ID. In such a case, the character recognition processing may be omitted and the previously-added character information may be acquired.

Figure 10:
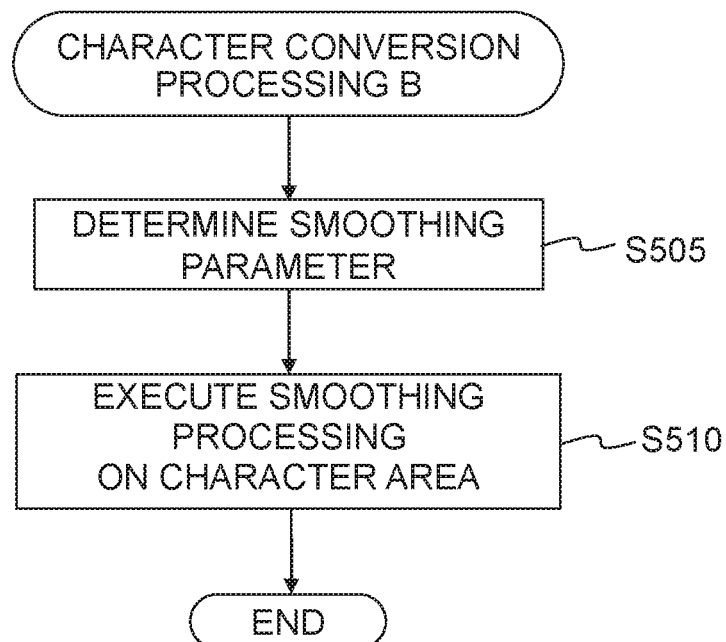
FIG. 10 is a flowchart of character conversion processing B of the second embodiment.

In the character conversion processing B of FIG. 10, the size P of the smoothing filter is used as the smoothing parameter SP. Instead of this, the number of times of application N of the smoothing filter may be used. In such a case, in the smoothing processing of the step S510, the CPU 210 executes processing for applying a smoothing filter of a fixed size to a character to be processed by the number of times of application N as the smoothing parameter SP.

The calculator 200 as the image processing apparatus executing the print processing of FIG. 2 may be different kinds of apparatuses different from the personal computer, such as the multifunction peripheral 100, digital cameras, scanners, and smart phones. When the multifunction peripheral 100 executes the print processing of FIG. 2, printing using the processed image data is performed by the printer unit 130 of the multifunction peripheral 100. The image processing apparatus executing the print processing of FIG. 2 may be, for example, a server that executes image processing by acquiring objective image data from the calculator 200 or the multifunction peripheral 100. Such a server may be calculators that can communicate with each other via a network. In that case, the whole of calculators that can communicate with each other via the network correspond to the image processing apparatus.

In each of the embodiments, the configuration achieved by hardware may be partially replaced with software. Instead, the configuration achieved by software may be partially or entirely replaced with hardware. For example, a part of the processing executed by the CPU 210 of the calculator 200 of FIG. 1 may be executed by a dedicated hardware circuit.

As above, the present teaching has been explained with the embodiments and modified embodiments. The embodiments described above are provided to facilitate understanding of the present teaching, and the present teaching is not limited to those. The present teaching may be changed or modified without departing from the gist and the scope of the claims below, and includes equivalents thereof.

What is claimed is:

1. An image processing apparatus comprising a controller configured to execute:
    acquiring objective image data representing an objective image which includes a first character and a second character, the objective image data including first partial image data in a bitmap format which represents an image including the first character and second partial image data in a vector format which represents an image including the second character;
    selecting object data from the objective image data;
    determining whether the selected object data is the first partial image data or the second partial image data;
    in a case of determining that the selected object data is the first partial image data:
        analyzing the first partial image data;
        specifying the first character in the image represented by the first partial image data; and
        generating processed image data representing a processed image which includes the first character and the second character by using the objective image data, the processed image data including first processed data and second processed data,
    wherein the first processed data is acquired by executing first conversion processing on the first partial image data and represents an image including the first character having edge intensity which is higher than edge intensity of the first character in the image represented by the first partial image data,
    wherein the second processed data represents an image including the second character having edge intensity which is not changed from edge intensity of the second character in the image represented by the second partial image data, and
    wherein in a case of determining that the selected object data is the second partial image data, the controller is configured not to execute:
        analyzing the second partial image data; and
        specifying the second character in the image represented by the second partial image data.

2. An image processing apparatus comprising a controller configured to execute:
    acquiring objective image data representing an objective image which includes a first character and a second character, the objective image data including first partial image data in a bitmap format which represents an image including the first character and has a first gradation number and second partial image data in a bitmap format which represents an image including the second character and has a second gradation number smaller than the first gradation number;
    analyzing the first partial image data;
    specifying at least the first character in the image represented by the first partial image data; and
    generating processed image data representing a processed image which includes the first character and the second character by using the objective image data,
the processed image data including first processed data and second processed data,
    wherein the first processed data is acquired by executing first conversion processing on the first partial image data and represents an image including the first character having edge intensity which is higher than edge intensity of the first character in the image represented by the first partial image data, and
    wherein the second processed data represents an image including the second character having edge intensity which is acquired by executing second conversion processing on the second partial image data and which is lower than the edge intensity of the second character in the image represented by the second partial image data.

3. The image processing apparatus according to claim 1, wherein, in the first conversion processing, the controller is configured to execute:
    generating character information which includes a character code of the first character and represents the first character by executing character recognition processing on the first partial image data; and
    generating the first processed data by using the character information.

4. The image processing apparatus according to claim 2, wherein, in the first conversion processing, the controller is configured to execute:
    generating character information which includes a character code of the first character and represents the first character by executing character recognition processing on the first partial image data; and
    generating the first processed data by using the character information.

5. The image processing apparatus according to claim 1, wherein, in the first conversion processing, the controller is configured to execute reducing a number of intermediate pixels along an edge of the first character in the image represented by the first partial image data, and
    each of the intermediate pixels includes a gradation value between a value representing a color of the first character and a value representing a background color.

6. The image processing apparatus according to claim 2, wherein, in the first conversion processing, the controller is configured to execute reducing a number of intermediate pixels along an edge of the first character in the image represented by the first partial image data, and
    each of the intermediate pixels includes a gradation value between a value representing a color of the first character and a value representing a background color.

7. The image processing apparatus according to claim 6, wherein the controller is configured to execute magnification processing of magnifying the image represented by the first partial image data depending on a size of the processed image, and
    in the first conversion processing, the controller is configured to execute:
        reducing the number of intermediate pixels depending on a first width, in a case that a magnification factor of the magnification processing is a first magnification factor; and
        reducing the number of intermediate pixels depending on a second width greater than the first width, in a case that the magnification factor of the magnification processing is a second magnification factor greater than the first magnification factor.

8. The image processing apparatus according to claim 1, wherein the controller is configured to execute:
    in a first case, the first conversion processing which includes:

generating character information including a character code of the first character which is acquired by executing character recognition processing on the first partial image data; and generating the first processed data by use of the character information; and in a second case, the first conversion processing which reduces a number of intermediate pixels in the image represented by the first partial image data, the intermediate pixels having a gradation value between a value representing a color of the first character and a value representing a background color and forming an edge of the first character.

9. The image processing apparatus according to claim 8, wherein the first case is a case in which the character recognition processing executed on the first partial image data results in a success rate not lower than a criterion; and the second case is a case in which the character recognition processing executed on the first partial image data results in a success rate lower than the criterion.

10. The image processing apparatus according to claim 2, wherein the controller is configured to execute the second conversion processing which increases a number of intermediate pixels in an image represented by the second partial image data, the intermediate pixels having a gradation value between a value representing a color of the second character and a value representing a background color and forming an edge of the second character.

11. A non-transitory computer-readable medium storing a program executable by a controller of an image processing apparatus, the program causing the controller of the image processing apparatus to execute:

acquiring objective image data representing an objective image which includes a first character and a second character, the objective image data including first partial image data in a bitmap format which represents an image including the first character and second partial image data in a vector format which represents an image including the second character;

selecting object data from the objective image data;

determining whether the selected object data is the first partial image data or the second partial image data;

in a case of determining that the selected object data is the first partial image data:

analyzing the first partial image data;

specifying the first character in the image represented by the first partial image data; and generating processed image data representing a processed image which includes the first character and the second character by using the objective image data, the processed image data including first processed data and second processed data, wherein the first processed data is acquired by executing first conversion processing on the first partial image data and represents an image including the first character having edge intensity which is higher than edge intensity of the first character in the image represented by the first partial image data, wherein the second processed data represents an image including the second character having edge intensity which is not changed from edge intensity of the second character in the image represented by the second partial image data, and wherein in a case of determining that the selected object data is the second partial image data, the program causes the controller not to execute:

analyzing the second partial image data; and specifying the second character in the image represented by the second partial image data.

12. A non-transitory computer-readable medium storing a program executable by a controller of an image processing apparatus, the program causing the controller of the image processing apparatus to execute:

acquiring objective image data representing an objective image which includes a first character and a second character, the objective image data including first partial image data in a bitmap format which represents an image including the first character and has a first gradation number and second partial image data in a bitmap format which represents an image including the second character and has a second gradation number smaller than the first gradation number;

analyzing the first partial image data;

specifying at least the first character in the image represented by the first partial image data; and generating processed image data representing a processed image which includes the first character and the second character by using the objective image data, the processed image data including first processed data and second processed data, wherein the first processed data is acquired by executing first conversion processing on the first partial image data and represents an image including the first character having edge intensity which is higher than edge intensity of the first character in the image represented by the first partial image data, and wherein the second processed data represents an image including the second character having edge intensity which is acquired by executing second conversion processing on the second partial image data and which is lower than the edge intensity of the second character in the image represented by the second partial image data.

* * * * *